(12) United States Patent
Bozionek et al.

(10) Patent No.: US 7,864,040 B2
(45) Date of Patent: Jan. 4, 2011

(54) LOCALIZATION SYSTEM AND LOCALIZATION METHOD AND MOBILE POSITION DATA TRANSMITTER

(75) Inventors: Bruno Bozionek, Borchen (DE); Thomas Hanna, Detmold (DE); Klaus-Josef Kunte, Borchen (DE); Rainer Zimmermann, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 459 days.

(21) Appl. No.: 11/921,126

(22) PCT Filed: May 11, 2006

(86) PCT No.: PCT/EP2006/062230
§ 371 (c)(1),
(2), (4) Date: Nov. 27, 2007

(87) PCT Pub. No.: WO2006/128783
PCT Pub. Date: Dec. 7, 2006

(65) Prior Publication Data
US 2009/0102639 A1    Apr. 23, 2009

(30) Foreign Application Priority Data
May 31, 2005    (DE) .................. 10 2005 024 874

(51) Int. Cl.
*G08B 1/08*    (2006.01)
(52) U.S. Cl. .................. 340/539.1; 340/539.13; 340/572.1
(58) Field of Classification Search ............ 340/539.1, 340/539.11, 539.13, 572.1
See application file for complete search history.

(56) References Cited

U.S. PATENT DOCUMENTS

| | | | | |
|---|---|---|---|---|
| 5,450,492 | A * | 9/1995 | Hook et al. | 340/572.4 |
| 6,427,121 | B2 | 7/2002 | Brodie | |
| 7,272,502 | B2 * | 9/2007 | Lee et al. | 340/539.13 |
| 7,295,114 | B1 * | 11/2007 | Drzaic et al. | 340/572.1 |
| 7,616,094 | B2 * | 11/2009 | Heinrich et al. | 340/10.2 |
| 2003/0218532 | A1 | 11/2003 | Hussmann | |

FOREIGN PATENT DOCUMENTS

| | | |
|---|---|---|
| CN | 1601227 A | 3/2005 |
| CN | 1602270 A | 3/2005 |
| DE | 196 27 736 A1 | 1/1998 |
| EP | 0 848 564 A2 | 6/1998 |
| EP | 0 903 686 A2 | 3/1999 |
| EP | 1 519 340 A1 | 3/2005 |
| WO | WO 02/091297 A1 | 11/2002 |

* cited by examiner

*Primary Examiner*—Eric M Blount

(57) ABSTRACT

There is described a localization system with a mobile position data transmitter having a position-detecting device for detecting a position of the position data transmitter and for deriving position data from the position detected. The position data transmitter also has a radio tag writing device for wirelessly emitting the derived position data with a write signal for writing to radio tags. The localization system also has radio tags which are to be spatially distributed and each have a memory for storing an item of localization information which is taken from the position data received with the write signal. A radio tag reading device is used to retrieve and output the stored read information from the radio tags that are situated in the retrieval range.

17 Claims, 3 Drawing Sheets

LOCALIZATION SYSTEM AND LOCALIZATION METHOD AND MOBILE POSITION DATA TRANSMITTER

CROSS REFERENCE TO RELATED APPLICATIONS

This application is the US National Stage of International Application No. PCT/EP2006/062230, filed May 11, 2006 and claims the benefit thereof. The International Application claims the benefits of German application No. 10 2005 024 874.8 DE filed May 31, 2005, both of the applications are incorporated by reference herein in their entirety.

FIELD OF INVENTION

In many technical applications the accessibility, locatability or general localization of persons or devices is becoming increasingly important; for example in the logistics, communications technology or data processing environment. In particular many applications in what is frequently referred to as the mobile office field are based on a localization or self-localization of persons or devices. In such mobile office environments different mobile users can alternately use different terminals while still retaining their respective personal configuration.

BACKGROUND OF INVENTION

In mobile office environments users are frequently localized when they login at a terminal which is able to determine their position or to which their spatial or geographical position is known. However this type of user localization demands a specific action on the part of the user to activate or login at this type of terminal. In addition it is very expensive to set up, manage and update these types of localization systems.

A widely-known localization system is the GPS (Global Positioning System) which generally allows very precise localization. However, because of the low field strength of the GPS signal, it is not possible as a rule to receive this signal within a building. This means that a GPS-based localization system can generally not be used especially in the office environment and in logistics applications within buildings.

SUMMARY OF INVENTION

An object of the present invention is to specify a flexible localization system and localization method that are able to be implemented at little expense. A further object of the invention is to specify a mobile position data transmitter for implementing the localization system and method.

This object is achieved by a localization system, by a localization method as well as by a mobile position data transmitter, as claimed in independent claims.

The inventive localization system has a mobile position data transmitter with a positioning device to detect at least one position assigned to the mobile position data transmitter and to derive position data from the at least one detected position. The position detection can in this case for example be undertaken by entering a room or desk number at the position detection device or in a radio-based manner, for example using mobile radio, GPS, Wireless LAN or Bluetooth. The mobile position data transmitter also features a radio tag writing device for wirelessly emitting the derived position data with a write signal for writing radio tags. The localization system also has radio tags which are to be spatially distributed and each have a memory for storing localization information which is taken from the position data received with the write signal. What are known as RFID (RFID: Radio Frequency Identification) transponders, frequently also known as RFID tags, can be used as radio tags, which can be made very small and at low cost. The localization system further features a radio tag reading device for retrieving and outputting the localization information of at least one radio tag located within the retrieval range.

The inventive localization system can be installed with low setup costs at almost any location. Very low-cost standard components can be employed for the radio tags and their writing or reading device. Furthermore the inventive localization system allows a very high level of localization accuracy with the appropriate spatial distribution of the radio tags. In addition the localization system provides almost unlimited expansion capabilities simply by using further distributed radio tags. In particular both a two-dimensional and also a three-dimensional position detection can be undertaken.

Advantageous embodiments and developments of the invention are specified in the dependent claims.

According to an advantageous development of the invention an evaluation unit coupled to the radio tag reader device can be provided which is used for recording the localization information retrieved by a number of radio tags and for deriving a position averaged over these radio tags from the recorded localization information. In this case for example the average can be taken from those radio tags which are located in the retrieval or receive zone of the radio tag reader device at the relevant point in time, meaning simultaneously, or during a predetermined time interval. In such cases different averaging processes, such as for example arithmetic, geometrical or weighted averaging or combinations thereof, can be used.

According to an advantageous embodiment of the invention the mobile position data transmitter can be configured for ongoing detection of its current position and for ongoing emission of the continuously updated position data derived from this. When the position data transmitter is moved position data is thus continuously emitted from chronologically consecutive positions of the position data transmitter.

Advantageously the radio tags can feature an averaging device in order to derive the localization information to be stored by averaging position data received at regular intervals. When position data transmitters are moved position data received at different points in time corresponds to the respective positions of the position data transmitter located within radio range at these points in time. By averaging over a number of positions located within the radio range an own position of a respective radio tag can be more accurately determined and stored as localization information. Arithmetic, geometrical or weighted averaging or combinations thereof can be used as averaging methods for example.

Furthermore the position detection device and the radio tags can each have an encryption module for protected transmission of the position data and/or for protected writing of the radio tags. In this way an intentional or unintentional falsification of the position data and/or of the localization information can be prevented.

Preferably the radio tags are to be distributed at intervals which correspond to or are less than roughly double the retrieval range. In this way an almost seamless coverage of the localization area can be achieved. Above and beyond this the localization accuracy can be increased by a denser distribution of the radio tags.

BRIEF DESCRIPTION OF THE DRAWINGS

An exemplary embodiment of the invention is explained in greater detail below with reference to the drawing.

The figures show the following schematic diagrams.

DETAILED DESCRIPTION OF INVENTION

Figure 1:
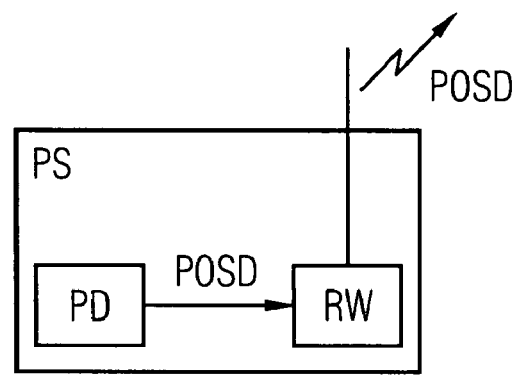
FIG. 1 a mobile position data transmitter.

FIG. 1 shows a schematic diagram of a mobile position data transmitter PS with a position detection device PD as well as radio tag writer RW. The position detection device PD continuously detects a respective current local position of the mobile position data transmitter PS and continuously transfers position data POSD derived from the detected positions to the radio tag writer RW. The position data POSD specifies the chronological sequence of current positions of the mobile position data transmitter PS. The position detection device PD can detect these positions for example within the framework of a manual entry of a room or desk number in a radio-based manner, e.g. via GPS, through radio direction finding, through field strength measurement etc. The radio tag writer RW can preferably be implemented by an RFID writing device (RFID: Radio Frequency Identification), also frequently referred to as an RFID writer. This type of RFID description device can be used to write data to writable RFID radio tags located within the transmission range. Inventively the position data POSD transferred by the position detection device PD is emitted by the radio tag writer RW wirelessly with a write signal which causes radio tags located within transmission range to store the position data POSD. The emission of the position data POSD is shown in FIG. 1 by a stylized lightning flash.

Figure 2:
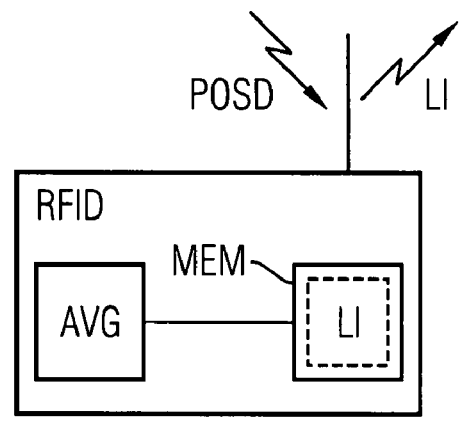
FIG. 2 a radio tag.

FIG. 2 shows a schematic diagram of a radio tag RFID with a memory MEM and an averaging device AVG coupled to it. The RFID radio tag can preferably be implemented as a writable RFID tag, frequently also as an RFID transponder. Writable RFID tags and those equipped with microprocessor capabilities are frequently also referred to as active or intelligent RFID tags.

Data can be written wirelessly to a radio tag with the radio tag writer RW and this data may subsequently be read out again with a radio tag reader. The radio tag RFID can obtain the power supply it requires for operation from an electromagnetic field emitted by the writer or reader and/or can have its own power supply, for example from batteries. The transmission range for reading or writing data can range for RFID tags from a few millimeters up to a few meters. For this exemplary embodiment it is assumed that the radio tag RFID has a transmission range of around one meter. The radio tag RFID accepts the position data POSD emitted by the mobile position data transmitter PS at regular intervals, which in the present exemplary embodiment are to be one second.

The position data obtained at one-second intervals is fed to the averaging device AVG. This takes an average of the position data supplied during a predetermined averaging interval and stores the calculated average value and localization information LI in the memory MEM. The present exemplary embodiment assumes an averaging interval of 5 seconds. The averaging method is preferably embodied such that the localization information LI precisely specifies the actual position of the radio tag RFID as accurately as possible depending on the movement of the mobile position data transmitter PS.

Figure 3:
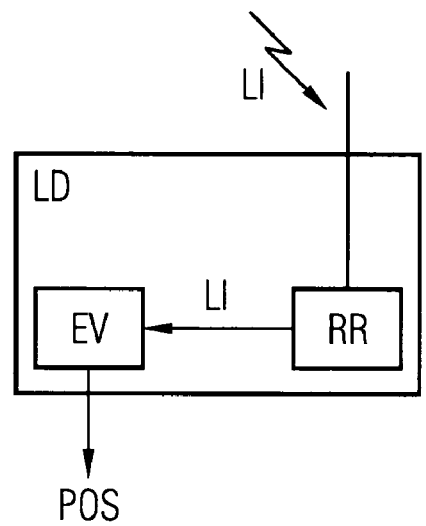
FIG. 3 a mobile localization device.

The stored localization information LI can be retrieved later by a mobile localization device LD which is shown schematically in FIG. 3. The mobile localization device LD features a mobile radio tag reader RR as well as an evaluation device EV coupled to the reader. The radio tag reader RR is used for wireless retrieval for wireless retrieval of data stored in radio tags, in this case the localization information LI. The radio tag reader RR can preferably be implemented by an RFID reader device frequently also referred to as an RFID sensor or RFID reader. The mobile localization device LD can for example be integrated into a PDA (Personnel Digital Assistant) or a mobile telephone.

The radio tag reader RR supplies the localization information LI received from the radio tags within retrieval range to the evaluation device EV. The evaluation device EV has an averaging device, through which, in the present exemplary embodiment, those radio tags are averaged via the localization information which are located simultaneously at a relevant point in time within the retrieval range. A position specification POS which specifies with great accuracy the actual position of the mobile localization device LD is obtained and output by the evaluation device EV.

As an alternative to integrating the evaluation device EV into the mobile localization device LD there can also be provision for the radio tag reader RR to forward the received localization information LI to an external evaluation service (not shown).

In FIGS. 4a to 4e and FIG. 5 each show a drawing of a spatial area provided with schematized coordinates X and Y, for example an office environment, in which an inventive localization is to be enabled. The spatial area shown is referred to below as the localization area. This localization area is typically divided up into localization cells that are specified in each case with reference to their position by a corresponding coordinate pair (X-coordinate, Y-coordinate). In the present exemplary embodiment the range of X-coordinate values is from one to five and the Y-coordinate values range from one to three. The coordinate values can for example be location or distance values in a two-dimensional or spatial reference system, room numbers, desk numbers or combinations of variables of this type.

For the present exemplary embodiment it is assumed that the distance between the localization cells roughly corresponds to the range of the radio tag RFID, in this case one meter. It is further assumed that radio tags, as described in conjunction with FIG. 2, are distributed over the entire localization area such that there is a radio tag in each localization cell. The transmission areas of the radio tags thus cover the localization area completely. In particularly a number of radio tags are located in transmission range at each point of the localization area. Because of the very low costs of active radio tags, office environments can thus be equipped with very dense networks of radio tags.

For reasons of clarity only the radio tag RFID with the coordinates (X=3, Y=2) located in the localization cell is explicitly shown in FIGS. 4a to 4e.

Figure 5:
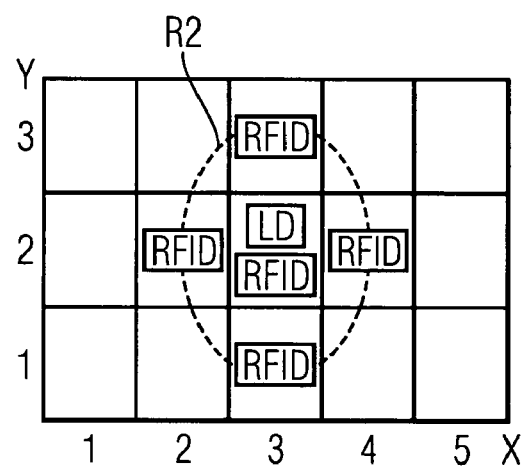

FIG. 5 only shows those of the radio tags RFID which are located within the retrieval range of the mobile localization device LD.

To set up the inventive localization system the radio tags RFID can be distributed by a service engineer in the unwritten or at least rewritable state, for example by gluing them under floorboards or desks in an office environment. The distribution density preferably roughly corresponds to the transmission range of the radio tags RFID. The localization accuracy obtainable corresponds roughly to the distribution density of the radio tags RFID which once again is oriented to their transmission range. A short transmission range of the radio tags RFID of about one meter and less thus corresponds to a high localization accuracy.

FIGS. 4a to 4e show schematically how the mobile position data transmitter PS moves through the localization area from localization cell (X=1, Y=2) to localization cell (X=5, Y=2). In this case the mobile position data transmitter PS writes position data POSD which specifies its respective current position into the radio tags RFID distributed over the localization area that are located within its transmission range R1. The writing of all radio tags RFID distributed over the localization area can be implemented in an especially simple manner by a service technician walking around with the mobile position data transmitter PS to cover the entire localization area. As regards the averaging of the position data POSD in a respective radio tag RFID described below it is advantageous for the mobile position data transmitter PS to move in the localization area at the most constant possible speed. In such cases the mobile position data transmitter PS continuously sends current position data POSD which is picked up by the radio tags RFID within its transmission range R1 at periodic intervals, in this case one second. An average value, that is stored as localization information LI, is formed from the picked up position data POSD in a respective radio tag RFID. The averaging significantly increases the accuracy with which the stored localization information LI reflects the actual position of the respective radio tag RFID, since the determination is based on a number of items of position data.

The averaging and writing process is described below with reference to FIGS. 4a to 4e, using as an example the radio tag RFID located in the localization cell (X=3, Y=2). It is assumed that the position data transmitter PS moves from localization cell (X=1, Y=2) via the localization cells (X=2, Y=2), (X=3, Y=2), (X=4, Y=2) into localization cell (X=5, Y=2). It is further assumed that the position data transmitter PS needs a second in each case to move from one localization into the next localization cell. FIGS. 4a to 4e accordingly illustrate the positions of the position transmitter PS at consecutive one-second intervals.

Figure 4A:
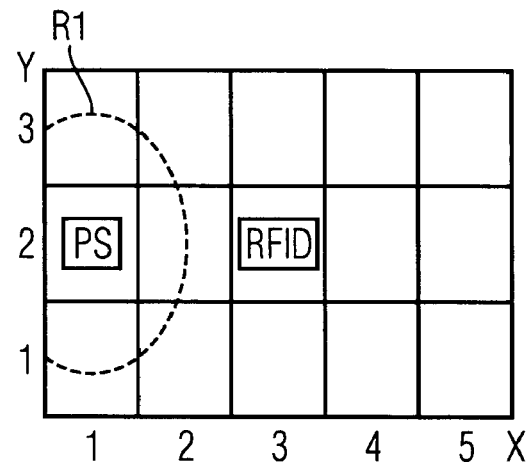
FIGS. 4a-e a localization area for setting up an inventive localization system and FIG. 5 the localization area on retrieval of localization information.

In FIG. 4a the position data transmitter PS is located in the localization cell (X=1, Y=2). Although the position data transmitter PS emits the position data POSD corresponding to its current position with the write signal, the radio tag RFID shown does not yet receive this position data POSD, since it is outside the transmission range R1 of the position data transmitter PS. The transmission range R1 corresponds in the present exemplary embodiment to the transmission range of the radio tag RFID.

Figure 4B:
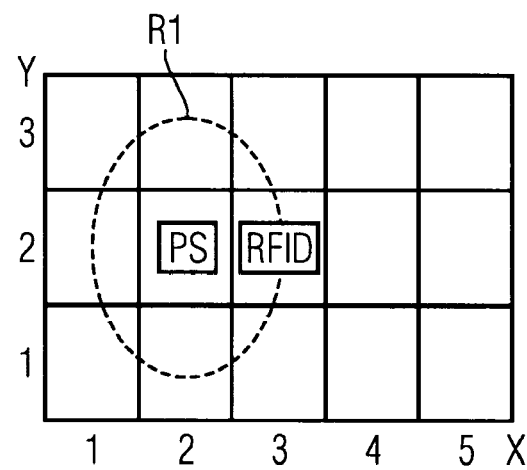

In FIG. 4b the position data transmitter PS is located in the localization cell (X=2, Y=2) and accordingly emits position data POSD specifying its position (X=2, Y=2) together with the write signal. The radio tag RFID now lies within the range R1 of the position data transmitter PS and thus receives the emitted position data POSD and stores the position coordinates (X=2, Y=2) contained within it for the subsequent averaging.

Figure 4C:
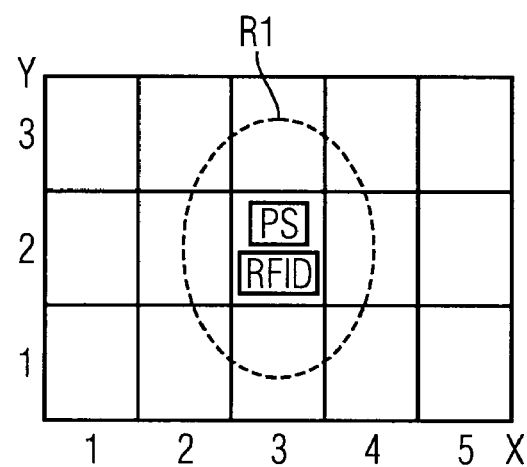

In FIG. 4c the mobile position data transmitter PS is located in the localization cell (X=3, Y=2) and emits corresponding position data POSD. The radio tag RFID located in the same localization cell receives the emitted position data POSD and stores the position coordinates (X=3, Y=2) contained within it. An average value is computed from the position coordinates received previously which in the present exemplary embodiment produces (X=2.5, Y=2).

Figure 4D:
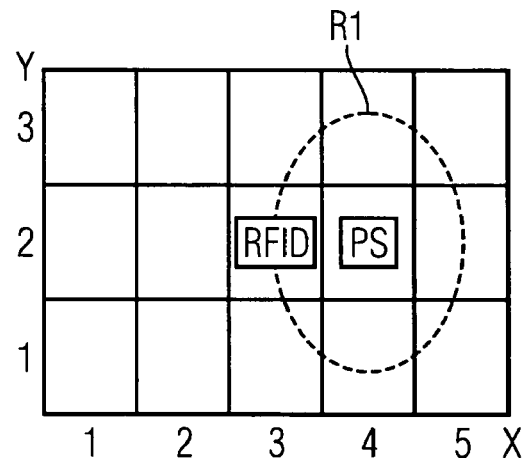

In FIG. 4d the position data transmitter PS is located in the localization cell (X=4, Y=2), so that the radio tag RFID located in range R1 receives the position coordinates (X=4, Y=2) with the emitted position data POSD. These position coordinates are averaged with the previously received position coordinates, which in the present exemplary embodiment produces an average value of (X=3, Y=2), i.e. the precise position of the radio tag RFID.

Figure 4E:
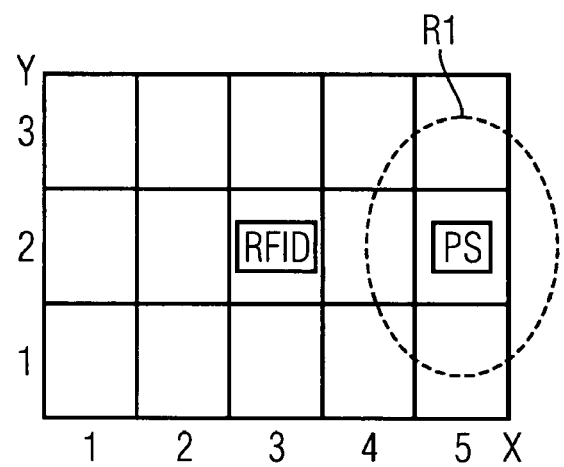

In FIG. 4e the position data transmitter PS is located in the localization cell (X=5, Y=2), so that the radio tag RFID is again located outside the transmission range R1. After a predetermined period of time has elapsed in which no further position data is received in the radio tag RFID, this tag stores the average value last calculated (X=3, Y=2) as localization information LI in the memory MEM.

In the previously described way all radio tags located in the localization area are written with localization information LI specifying their respective position. Subsequently the localization information LI of the described radio tags can be read out by the mobile localization device LD in order to determine their own position with high accuracy.

The position determination of the mobile localization device LD is illustrated by FIG. 5. For reasons of clarity FIG. 5 only shows the mobile localization device LD located in the localization cell (X=3, Y=2) as well as the radio tags RFID located within its retrieval range R2. The retrieval range R2 corresponds in the present exemplary embodiment to the transmission range of the radio tags RFID and thereby to the transmission range R1 of the mobile position transmitter PS.

The mobile localization device LD emits a polling signal which causes the radio tags RFID located in the retrieval range R2 to transmit in each case their stored localization information LI to the mobile localization device LD. For the present exemplary embodiment it is assumed that the localization information LI stored in the respective radio tag RFID corresponds to the coordinate position of this radio tag RFID.

The mobile localization device LD thus receives with the respective localization information LI the position coordinates (X=3, Y=3), (X=2, Y=2), (X=3, Y=2), (X=4, Y=2) and (X=3, Y=1) of the radio tags RFID simultaneously located within range R2. The received position coordinates are supplied to the radio tag reader RR of the evaluation device EV. The evaluation device EV takes the average of the received position coordinates and specifies the resulting arithmetic average (X=3, Y=2) as position specification POS. The averaged position specification POS corresponds in the present exemplary embodiment to precisely the actual position of the mobile localization device LD in the localization area.

Because of the averaging the averaged position specification POS even reflects the actual position of the mobile localization device LD with high accuracy in less ideal environments. The localization accuracy can be increased even further if the evaluation device EV also uses localization information received at different times to determine the position of the localization device LD by a type of triangulation covering a number of radio tag positions.

If the radio tags RFID are distributed at intervals corresponding roughly to their transmission range the inventive localization system is very fault-tolerant. Even if a few individual radio tags RFID fail there are generally sufficient radio tags remaining to guarantee full-coverage retrieval of the localization information and thereby to determine the position of the mobile localization device LD. A failure of individual radio tags RFID can in addition be detected in a simple manner by the currently determined position specifications POS being compared with position specifications POS determined earlier at the same location. A failure of a radio tag RFID within the retrieval range would become discernable by a small deviation of the average value. Based on this the inventive localization system can be expanded in a simple manner by means for self-diagnosis.

The invention claimed is:

1. A localization system, comprising;
   a mobile position data transmitter having:
   a position detection device for detecting at least one position assigned to the mobile position data transmitter and for deriving position data from at least one detected position, and
   a radio tag writer for wirelessly emitting the derived position data with a write signal for writing radio tags;
   radio tags for distribution within a space, wherein each radio tag has a memory for storing localization information obtained from position data received with the write signal; and
   a radio tag reader for retrieving and outputting the localization information stored by at least one radio tag located within a retrieval range.

2. The localization system as claimed in claim 1, further comprising an evaluation device coupled to the radio tag reader to detect localization information retrieved from a plurality of the radio tags.

3. The localization system as claimed in claim 2, wherein the evaluation device detects localization information from the plurality of the radio tags and derives a position specification averaged over the plurality of the radio tags based on the detected localization information.

4. The localization system as claimed in claim 1, wherein the mobile position data transmitter detects continuously a current position and emits continuously the position data, wherein the position data are derived continuously from the current positions of the mobile position data transmitter.

5. The localization system as claimed in claim 3, wherein the mobile position data transmitter detects continuously a current position and emits continuously the position data, wherein the position data are derived continuously from the current positions of the mobile position data transmitter.

6. The localization system as claimed in claim 4, wherein the radio tags have an averaging device to derive the localization information by averaging position data obtained at regular intervals.

7. The localization system as claimed in claim 5, wherein the radio tags have an averaging device to derive the localization information by averaging position data obtained at regular intervals.

8. The localization system as claimed in claim 1, wherein the position detection device has a first encryption module and the radio tag has a second encryption module, wherein the encryption modules protect a transmission of the position data.

9. The localization system as claimed in claim 1, wherein the position detection device has a first encryption module and the radio tag has a second encryption module, wherein the encryption modules protect writing on the radio tags.

10. The localization system as claimed in claim 1, wherein the position detection device has a first encryption module and the radio tag has a second encryption module, wherein the encryption modules are for a protected transmission of the position data and for a protected writing of the radio tags.

11. The localization system as claimed in claim 1, wherein the radio tags are spaced at intervals essentially twice a retrieval range.

12. The localization system as claimed in claim 1, wherein the radio tags are spaced at intervals which are less than a retrieval range.

13. A localization method, comprising:
   providing a mobile position data transmitter;
   detecting at least one position assigned to the mobile position data transmitter;
   determining position data of the mobile position data transmitter based on the detected position of the mobile position data transmitter;
   emitting wirelessly the determined position via a write signal for writing radio tags;
   receiving the writing signal by a radio tag;
   storing localization information obtained from the position data by the radio tag;
   retrieving the localization information stored by the radio tag by a radio tag reader, wherein the radio tag is located within a retrieval range; and
   outputting the localization information by the radio tag reader.

14. The localization method as claimed in claim 13, wherein an evaluation device is coupled to the radio tag reader detecting localization information retrieved from a plurality of radio tags.

15. The localization method as claimed in claim 14, wherein the evaluation device detects localization information from the plurality of radio tags and derives a position specification averaged over the plurality of radio tags based on the detected localization information.

16. The localization method as claimed in claim 15, wherein the mobile position data transmitter detects continuously a current position and emits continuously the position data, wherein the position data are derived continuously from the current positions of the mobile position data transmitter.

17. The localization method as claimed in claim 16, wherein the position detection device has a first encryption module and the radio tag has a second encryption module, wherein the encryption modules protect the transmission of the position data and protect the writing of the radio tags.

* * * * *